(12) United States Patent
Venghaus

(10) Patent No.: US 8,657,250 B2
(45) Date of Patent: Feb. 25, 2014

(54) MOUNT FOR A MOBILE SATELLITE ANTENNA SYSTEM WITH VIBRATION AND SHOCK ISOLATION

(75) Inventor: Brent Lee Venghaus, Mount Pleasant, IA (US)

(73) Assignee: Winegard Company, Burlington, IA (US)

( * ) Notice: Subject to any disclaimer, the term of this patent is extended or adjusted under 35 U.S.C. 154(b) by 215 days.

(21) Appl. No.: 13/051,367

(22) Filed: Mar. 18, 2011

(65) Prior Publication Data

US 2012/0068040 A1 Mar. 22, 2012

Related U.S. Application Data

(60) Provisional application No. 61/315,627, filed on Mar. 19, 2010.

(51) Int. Cl.
*A47B 97/00* (2006.01)
(52) U.S. Cl.
USPC ............ 248/500; 248/499; 248/560; 248/615
(58) Field of Classification Search
USPC .................................. 248/499, 500, 560, 615
See application file for complete search history.

(56) References Cited

U.S. PATENT DOCUMENTS

| | | | | |
|---|---|---|---|---|
| 3,952,979 | A | * | 4/1976 | Hansen .......................... 248/550 |
| 4,778,037 | A | * | 10/1988 | Papadopoulos ............... 188/378 |
| 5,549,285 | A | | 8/1996 | Collins |
| 6,023,245 | A | * | 2/2000 | Gomez et al. .................. 343/725 |
| 6,244,579 | B1 | | 6/2001 | Latvis, Jr. |
| 6,290,217 | B1 | * | 9/2001 | Schneider et al. ............ 267/148 |
| 6,406,011 | B1 | | 6/2002 | Kosar et al. |
| 6,530,563 | B1 | | 3/2003 | Miller et al. |
| 7,266,451 | B2 | * | 9/2007 | Bringuel et al. .............. 701/468 |
| 7,382,327 | B2 | | 6/2008 | Nelson |
| 7,487,958 | B2 | * | 2/2009 | Wang ............................ 267/136 |
| 7,679,573 | B2 | * | 3/2010 | Shuster et al. ................ 343/766 |
| 2008/0186242 | A1 | | 8/2008 | Shuster et al. |
| 2009/0262033 | A1 | | 10/2009 | King et al. |

OTHER PUBLICATIONS

Compact Wire Rope Isolators, Enidine Innovations brochure, Jan. 1, 2002, 2 pages, vol. 1, Issue 2.
Compact Wire Rope Isolators—CR Series, Enidine brochure, Jan. 1, 2002, p. 35.

* cited by examiner

*Primary Examiner* — Amy J Sterling
(74) *Attorney, Agent, or Firm* — W. Scott Carson

(57) ABSTRACT

A vibration and shock isolation mount for a mobile satellite antenna system securable to a transport vehicle such as a truck or boat. The isolation mount includes three isolators attachable between the mobile satellite antenna system and the transport vehicle. The three isolators are spaced substantially evenly about the central axis of the antenna system. Each isolator has a central spring element extending along a first axis between two block members wherein the spring element permits the two block members to move in virtually all direction relative to each other including toward and away from each other along the first axis of the spring element. Each isolator further includes two attaching members for respectively securing the two block members to the mobile satellite antenna system and the transport vehicle. The first axes of the spring elements are aligned to substantially intersect each other and the central axis of the mobile satellite antenna system within a protective, covering dome of the antenna system. The isolators are preferably positioned outside of the domed antenna system so that the domed antenna system itself can be as compact as possible to minimize its overall size and weight.

15 Claims, 11 Drawing Sheets

MOUNT FOR A MOBILE SATELLITE ANTENNA SYSTEM WITH VIBRATION AND SHOCK ISOLATION

RELATED PATENT APPLICATIONS

This application claims the benefit of U.S. Provisional Patent Application Ser. No. 61/315,627 filed Mar. 19, 2010, which is incorporated herein by reference.

BACKGROUND OF THE INVENTION

1. Field of the Invention

This invention relates to mounts for mobile satellite antenna systems for use on transport vehicles such as trucks and boats and more particularly, to mounts for domed satellite antenna system for mobile use in environments having isolators to minimize vibration and shock.

2. Discussion of the Background

The use of domed mobile satellite antenna systems has grown significantly especially for use on trucks and boats. Such use often incurs extreme vibration and severe shock that may damage the electronics and mechanical components contained in the satellite system. When mounted on a truck, for example, the satellite antenna system undergoes road vibration which at times may be extreme due to the condition of the road. Likewise, the satellite antenna system may encounter severe shock when the truck hits pot holes, goes over railroad crossings, or encounters other road hazards. Similar vibration and shock occur in the use on recreational vehicles (RV's), boats, and other forms of transportation carrying mobile satellite systems. Such vibration and shock can be quite intense and greatly increase the failure rate of the satellite antenna systems.

The vibration and shock forces while primarily occurring in the vertical direction with respect to the ground can also occur in nearly all directions about the mounted satellite antenna system. A need thus exists for vibration and shock isolation mounts for mobile satellite antenna systems for use with virtually any form of transportation to minimize such forces in essentially all directions.

In some conventional domed mobile satellite antenna systems, isolators are placed inside the dome. When placed inside the dome, a larger dome is then required. Consequently, a need also exists to provide for the use of isolators positionable outside the dome of the satellite antenna system.

A further need exists for mounts that can easily but securely attach such domed mobile satellite antenna systems to the roof or sides of a transport vehicle.

SUMMARY OF THE INVENTION

This invention involves a vibration and shock isolation mount for a mobile satellite antenna system securable to a transport vehicle such as a truck or boat. The isolation mount absorbs and greatly reduces vibrations and shocks generated by the moving vehicle to permit more efficient and longer lasting operation of the mobile satellite antenna system. The isolation mount includes three isolators attachable between the mobile satellite antenna system and the transport vehicle. The three isolators are spaced substantially evenly about the central axis of the antenna system. Each isolator has a central spring element extending along a first axis between two block members. The spring element permits the two block members to move in virtually all direction relative to each other including toward and away from each other along the first axis of the spring element. Each isolator further includes two attaching members for respectively securing the two block members to the mobile satellite antenna system and the transport vehicle with the first axis of the spring element aligned to substantially intersect each other and the central axis of the mobile satellite antenna system.

Each of the first axes of the spring elements preferably intersects the central axis of the antenna system at substantially 45 degrees. The antenna system also preferably has a protective, covering dome with the first axes of the spring elements preferably intersecting each other and the central axis of the antenna system within the protective, covering dome. The isolators are positioned in the preferred embodiments outside of the domed antenna system so that the domed antenna system itself can be as compact as possible to minimize its overall size and weight.

DETAILED DESCRIPTION OF THE INVENTION

Figure 1:
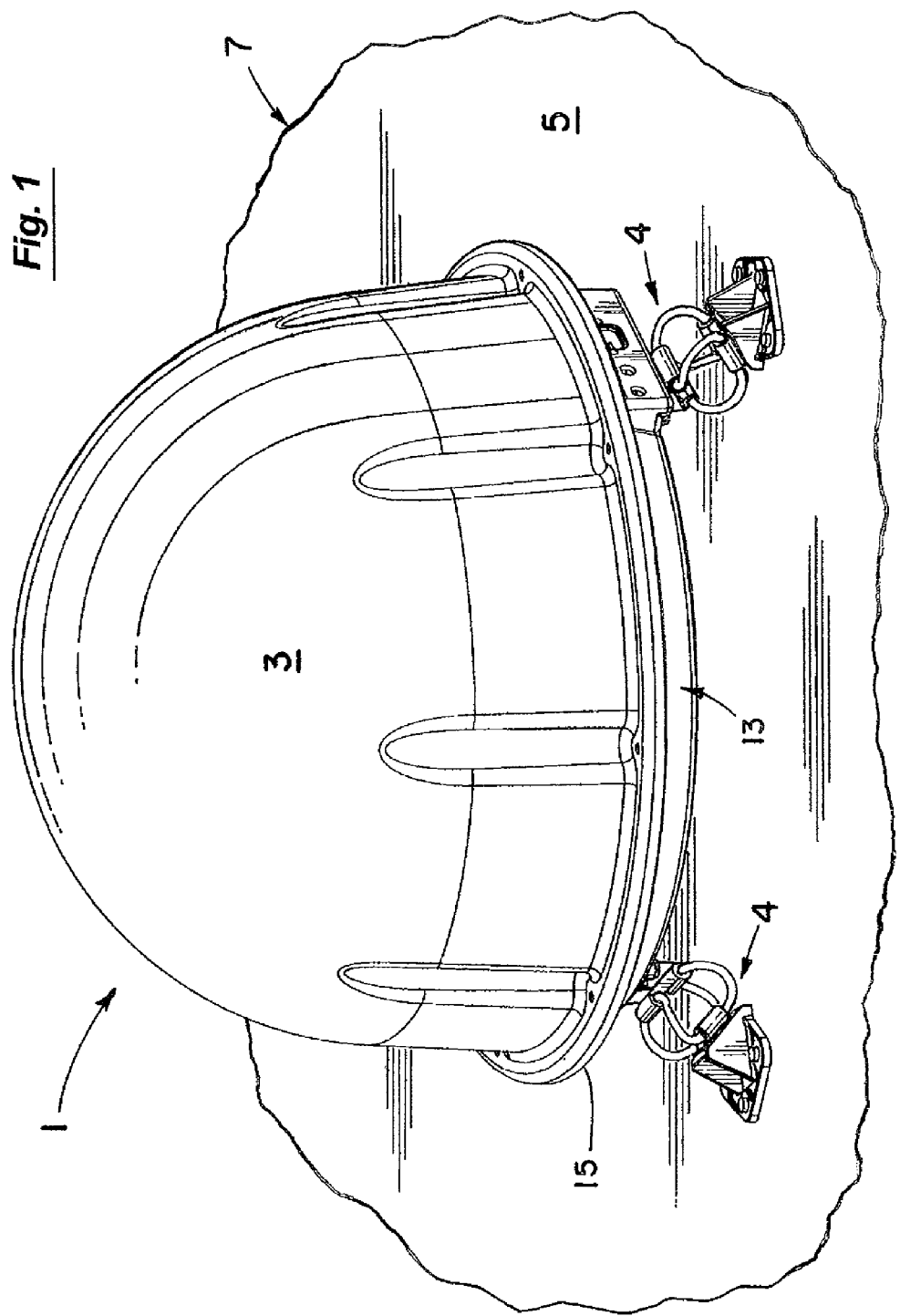
FIG. 1 is a perspective view illustrating a domed mobile satellite antenna system mounted with isolators of the present invention on a substantially horizontal surface of a transport vehicle such as its roof.
Figure 2:
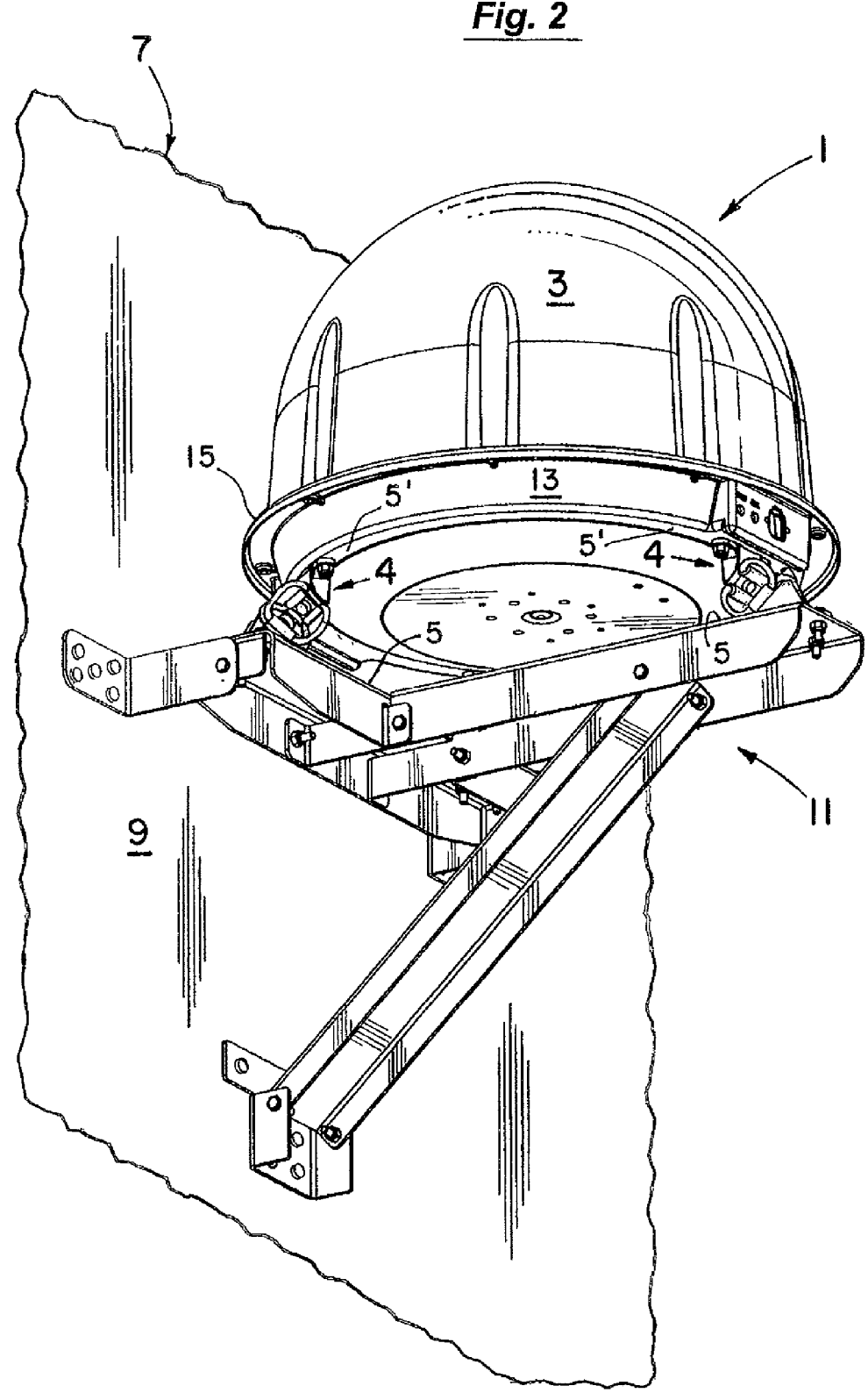
FIG. 2 is a perspective view illustrating the domed mobile satellite antenna system mounted with isolators of the present invention to the side of a transport vehicle using a side support arrangement.

FIG. 1 illustrates a mobile satellite antenna system 1 with a protective, covering dome 3 mounted according to the present invention to the roof 5 or other substantially horizontal surface of a transport vehicle 7 such as a truck or boat. In FIG. 2, the same antenna system 1 is shown mounted to the side 9 of such a transport vehicle 7 by a side support arrangement 11. The transport vehicle 7 in this regard can be virtually any form of transportation including a truck, recreational vehicle (RV), marine vessel, train car, or tractor. The mobile satellite antenna system 1 itself is of conventional design and a variety of such domed antenna systems are commercially available. The illustrated antenna system 1 of FIGS. 1-2 in this regard has a bottom or base portion 13 with a rim portion at 15 to which the protective, covering dome 3 is attached.

Figure 3:
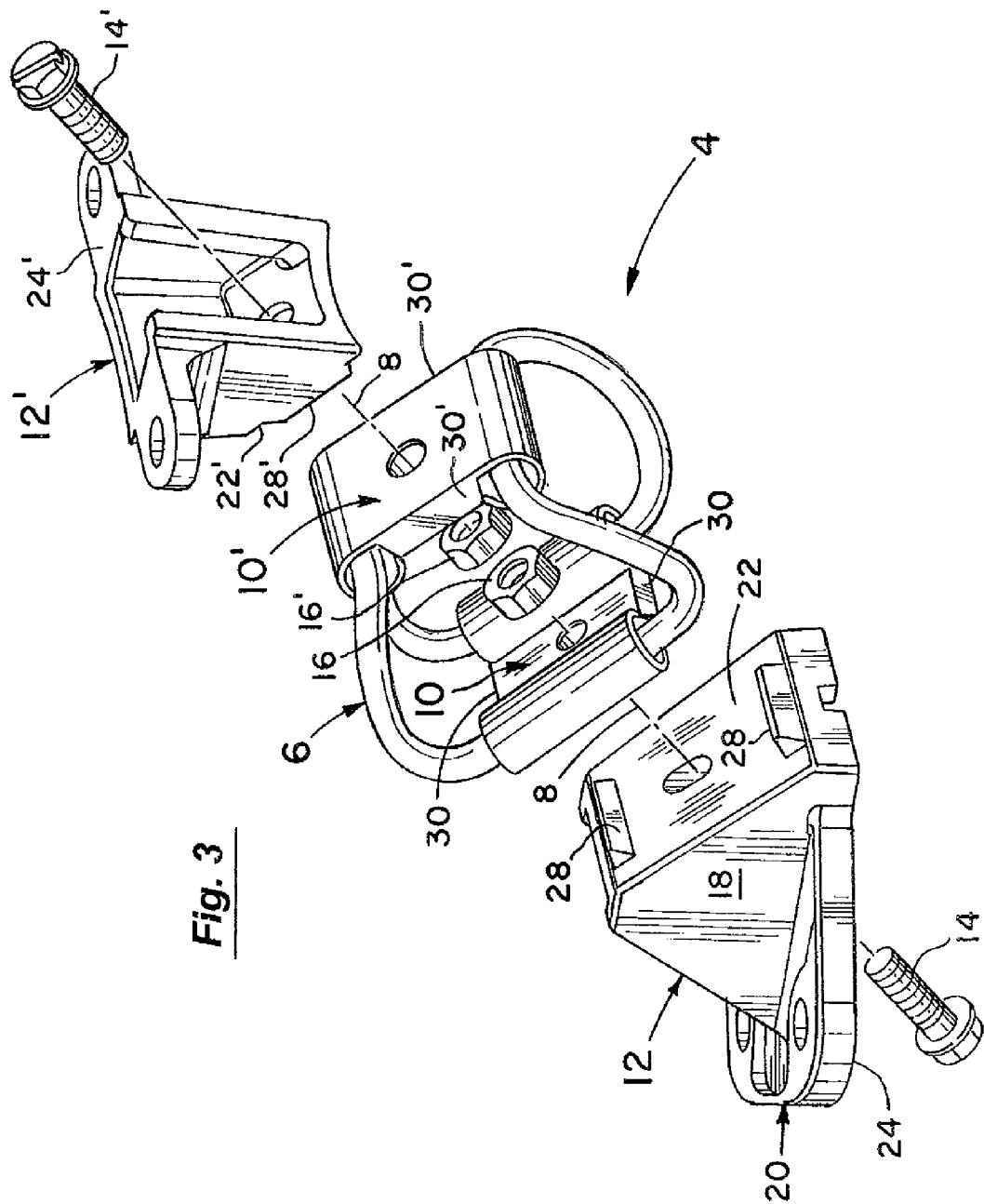
FIG. 3 is an exploded perspective view of an isolator of the present invention illustrating its central spring element, block members, and attaching members.
Figure 4A:
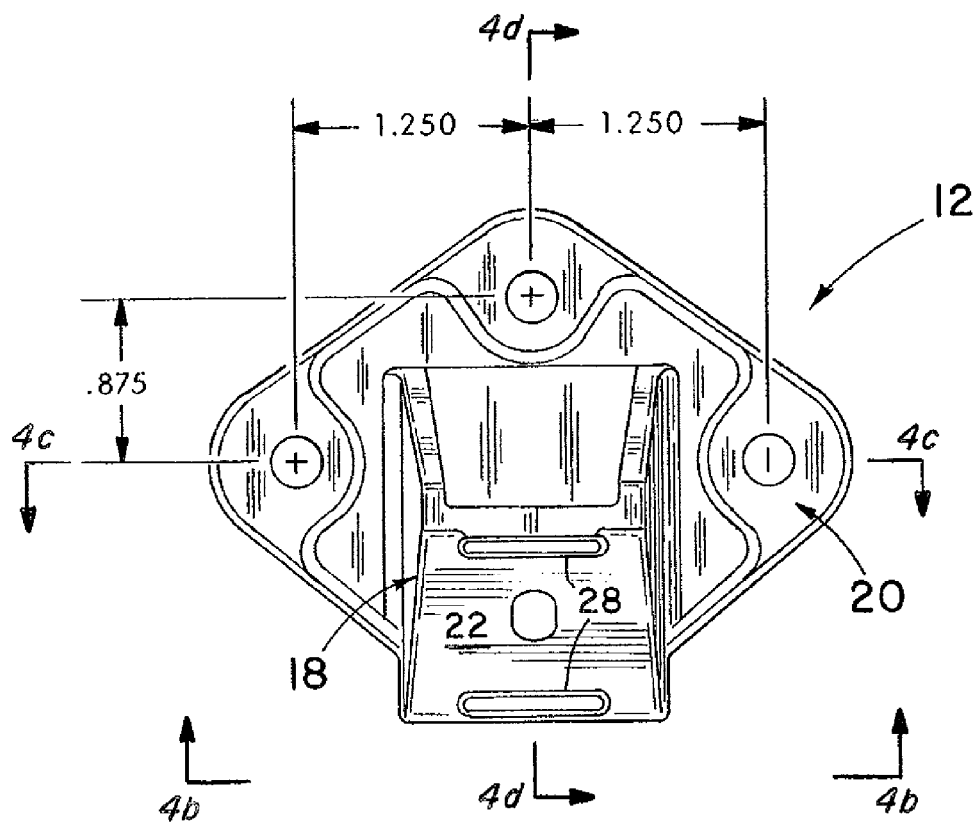
FIGS. 4a-4d are detailed views of the lower attaching member of the isolator.
Figure 4B:
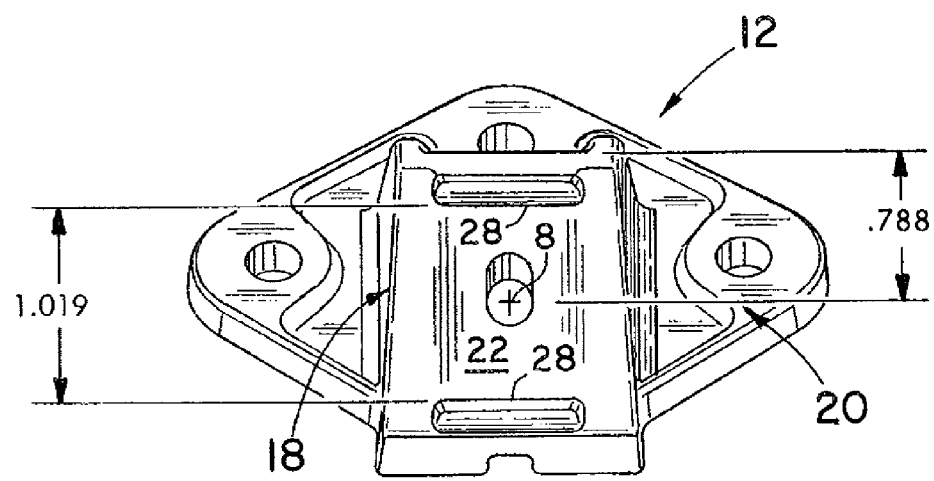
Figure 4C:
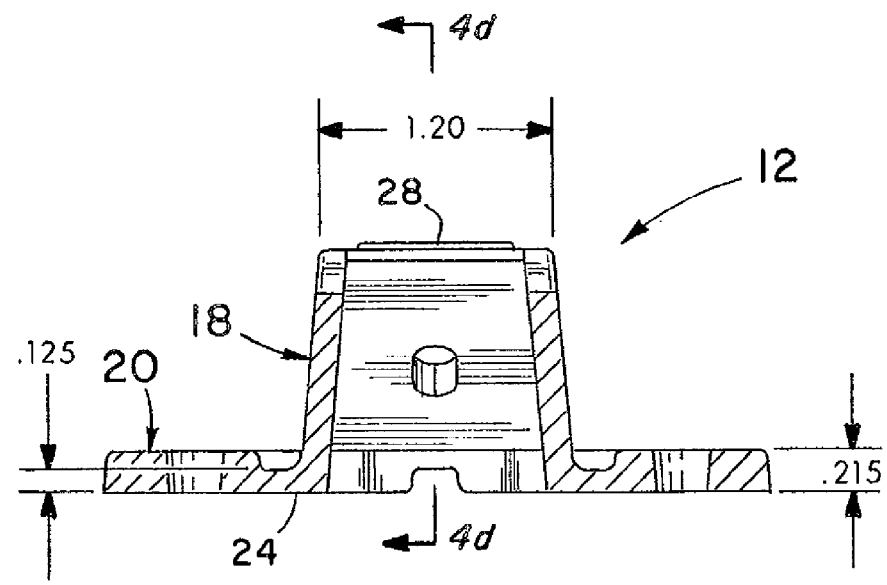
Figure 4D:
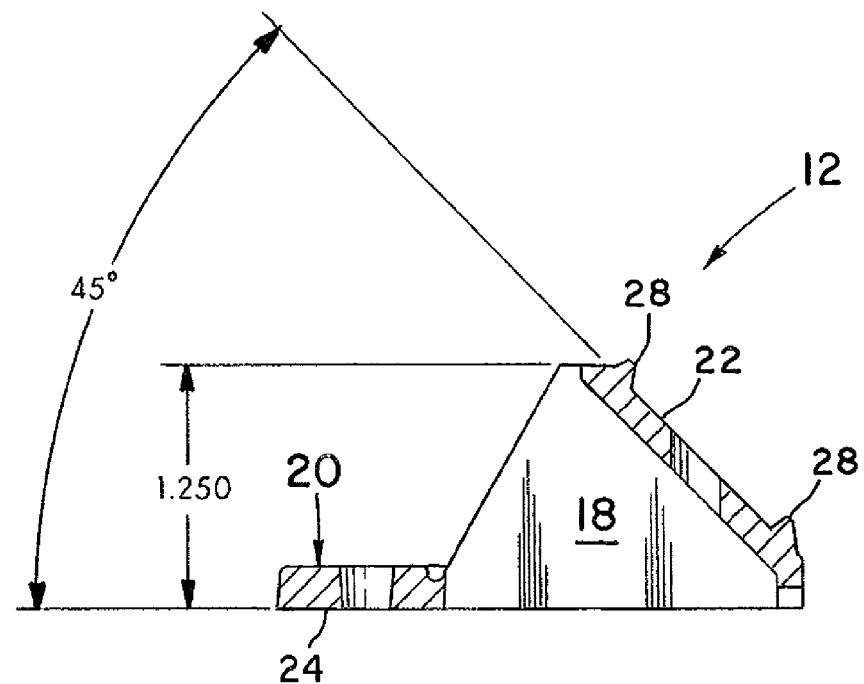
Figure 5A:
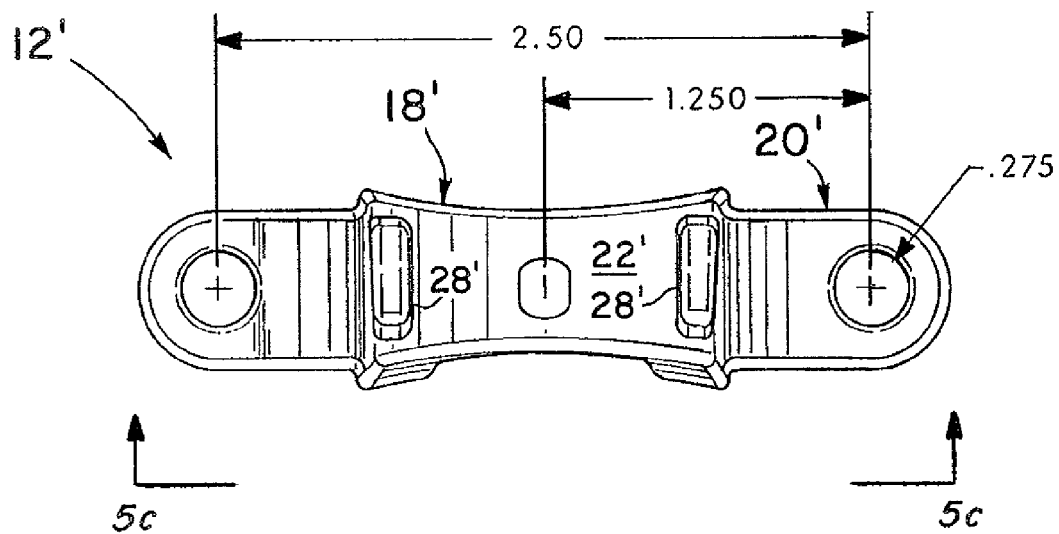
FIGS. 5a-5d are detailed views of the upper attaching member of the isolator
Figure 5B:
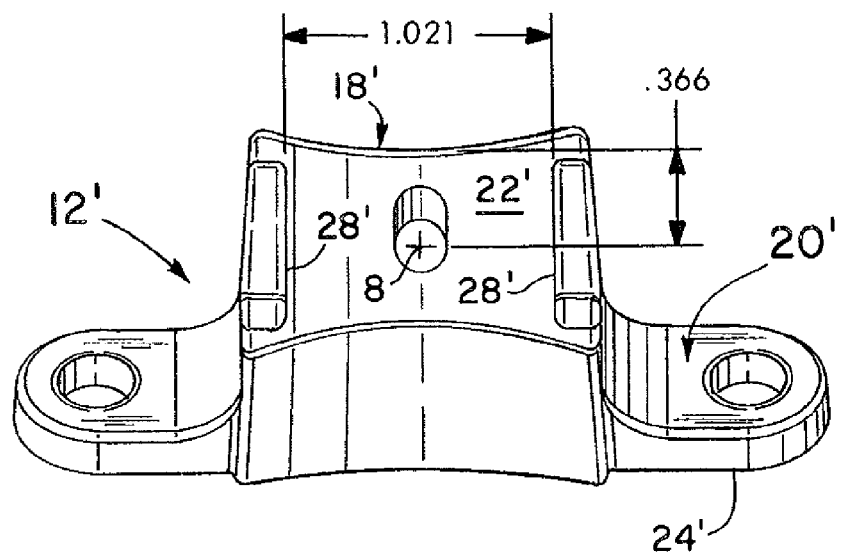
Figure 5C:
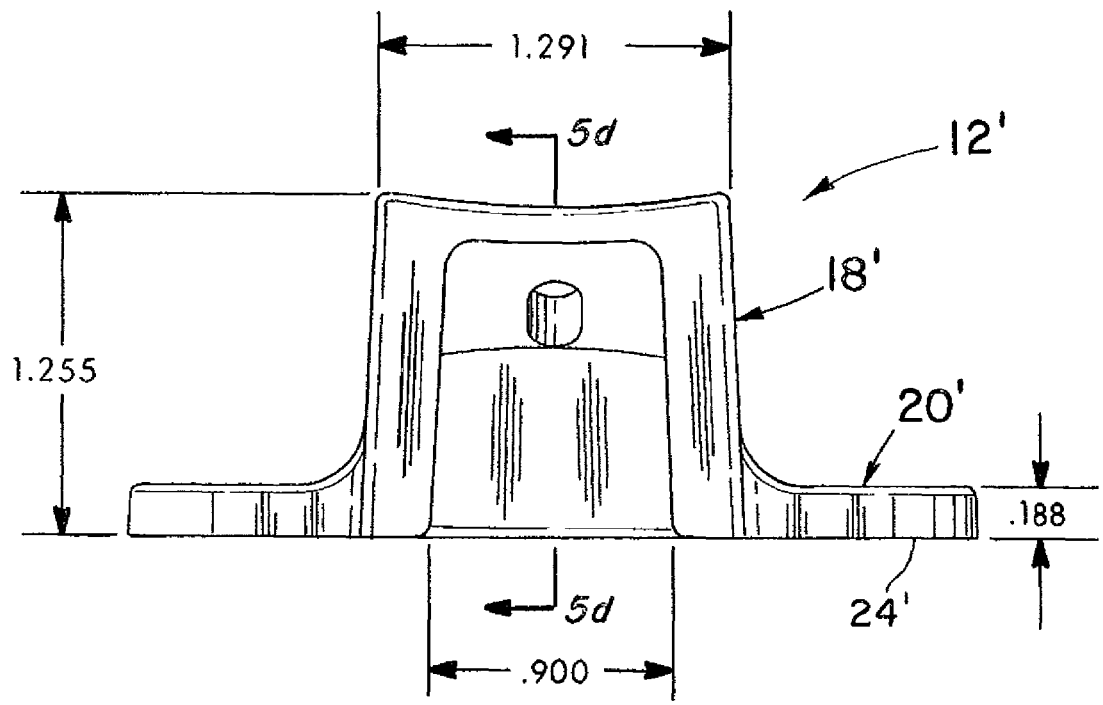
Figure 5D:
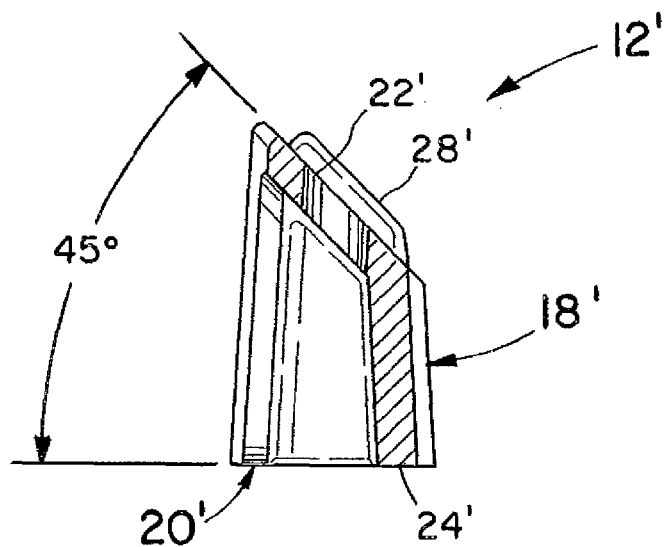

The mount of the present invention includes vibration and shock isolators 4 as shown in FIG. 1 mounted between the mobile satellite antenna system 1 and the roof 5 of the transport vehicle 7. The mount preferably has three such isolators 4, two of which are visible in the view of FIG. 1 with the third being hidden from view in the rear. Each isolator 4 as best seen in FIG. 3 has a central spring element 6 extending along a first axis 8 and secured between lower and upper block members 10,10'. The spring element 6 (e.g., wire rope as in U.S. Pat. No. 6,290,217) permits the block members 10,10' to move in virtually any direction relative to each other including toward and away from each other along the first axis 8. Each isolator 4 of the present invention further includes lower and upper attaching members 12,12' respectively securable to the lower and upper block members 10,10' by the illustrated bolts 14,14' and nuts 16,16'.

Further details of the lower and upper attaching members 12,12' of the present invention are respectively shown in FIGS. 4a-4d and 5a-5d. The dimensions are given in inches but are for general reference only. In FIGS. 4a-4d, the lower attaching member 12 is shown to have a substantially triangular, upright section 18 (perhaps best seen in FIG. 3). The triangular, upright section 18 extends upwardly from the base section 20 (FIG. 3) of the lower attaching member 12. The inclined surface 22 of the triangular section 18 (FIGS. 3 and 4d) preferably extends at substantially 45 degrees (FIG. 4d) from the bottom surface 24 of the base section 20. The upper attaching member 12' in FIGS. 5a-5d similarly has an raised section 18' (FIGS. 5c-5d) with a surface 22' (FIGS. 5b and 5d) that preferably extends substantially 45 degrees (FIG. 5d) from the surface 24' of the base section 20' of the attaching member 12' (see also FIG. 3).

The inclined surface 22 of the lower attaching member 12 in FIGS. 3 and 4a-4d has a pair of spaced apart ribs or raised ridges 28. The ridges 28 on inclined surface 22 on the lower attaching member 12 (FIG. 3) are substantially parallel to each other as shown. In operation, the ridges 28 serve to abut and capture or seat the side portions 30 (FIG. 3) in a fixed position on the lower attaching member 12 of the isolator 4 when the bolt 14 and nut 16 are tightened. In this manner, rotation of the block member 10 and attaching member 12 relative to each other about the axis 8 is prevented. Relative sliding movement of the block member 10 between the ridges 28 is also prevented. Similarly, the upper attaching member 12' has a pair of spaced apart ridges 28' on the inclined surface 22' (FIGS. 5a-5b) to abut and capture the spaced apart, substantially parallel side portions 30' (FIG. 3) of the upper block member 10'. Rotational movement between the upper block member 10' and upper attaching member 12' is then prevented.

Figure 6:
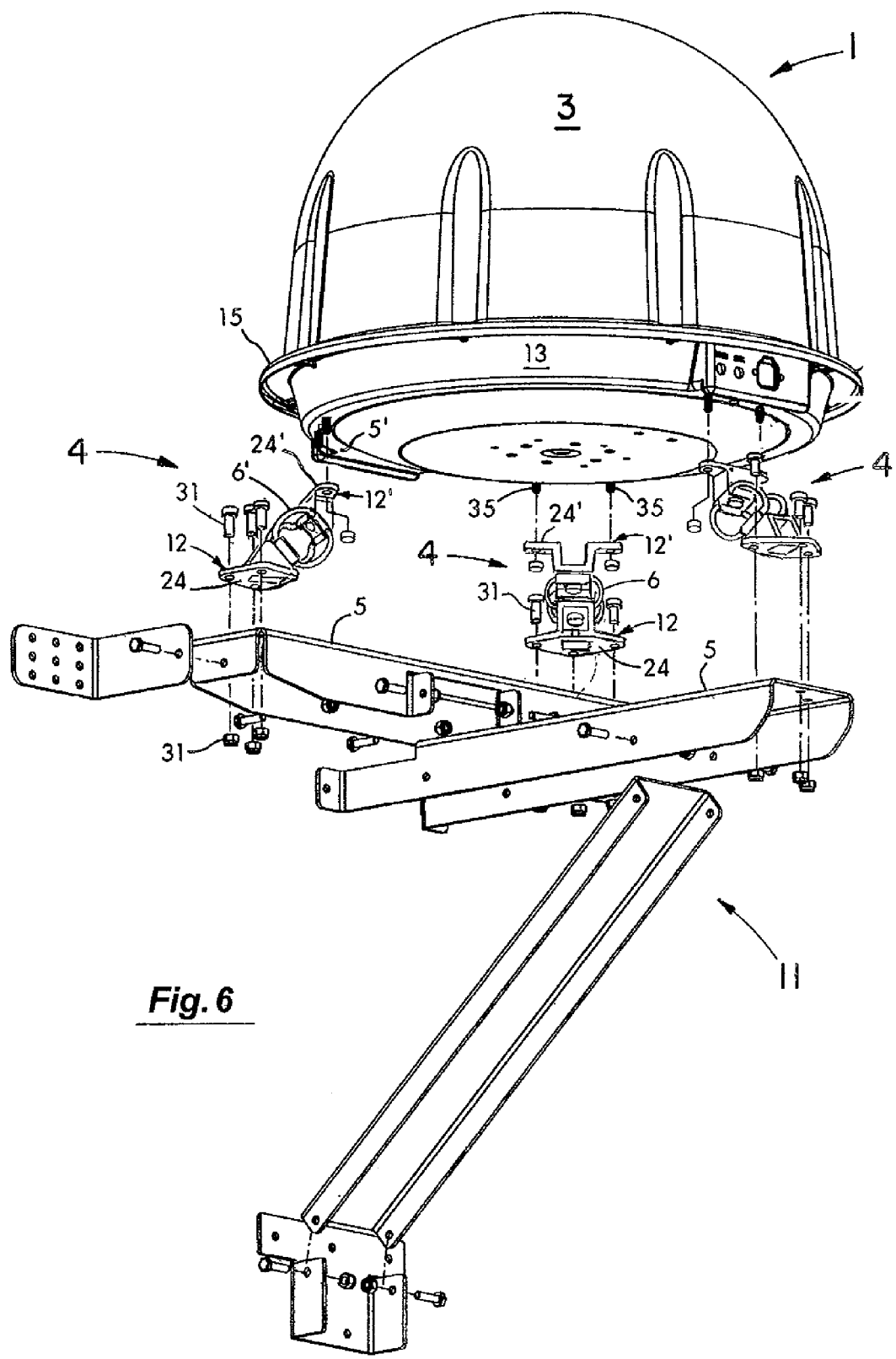
FIG. 6 is a partially exploded view of the side support arrangement of FIG. 2 on which the antenna system can be mounted.
Figure 7A:
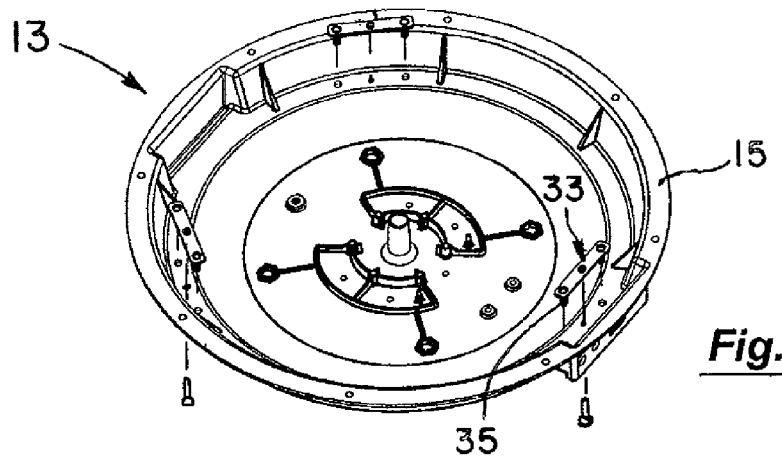
FIGS. 7a-7c illustrate details of the base portion of the antenna system.
Figure 7B:
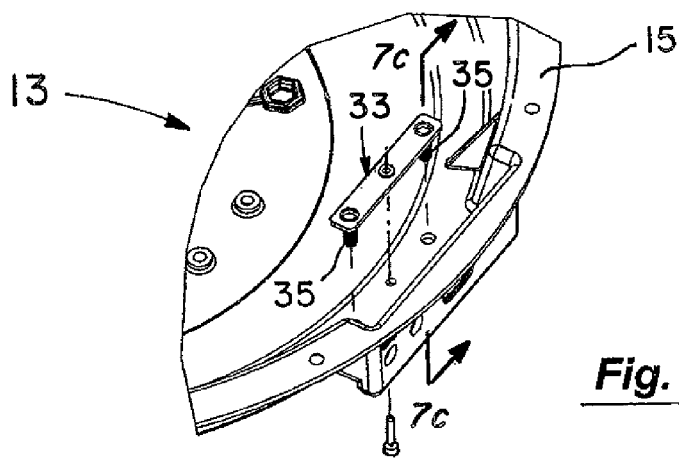
Figure 7C:
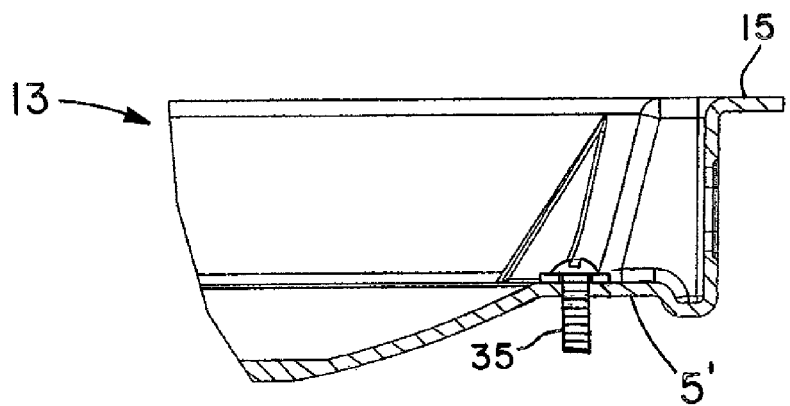
Figure 8:
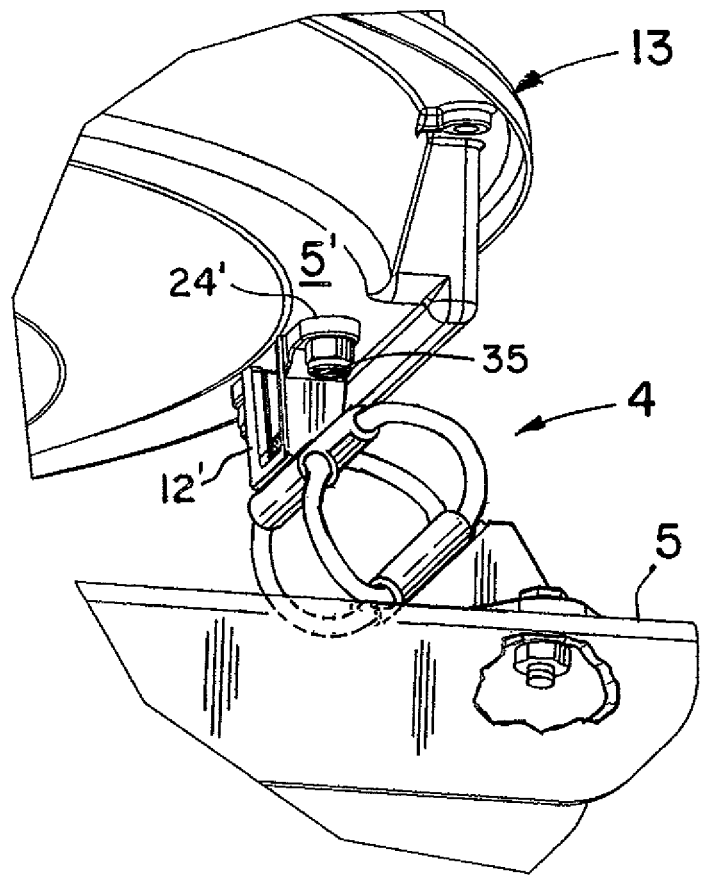
FIG. 8 is a perspective view of the antenna system as secured by an isolator of the present invention to the side support arrangement of FIGS. 2 and 6.

As shown in FIG. 1, each vibration and shock isolator 4 is mounted between the base portion 13 of the domed antenna system 1 and the substantially horizontal surface 5 of the transport vehicle 7. The substantially horizontal and preferably flat surface 5 in FIG. 1 can be an existing surface such as the roof of a transport vehicle 7. However, it can be a constructed surface 5 such as provided by the side support arrangement 11 in FIGS. 2 and 6. Regardless and as perhaps best seen in the exploded view of FIG. 6, each lower attaching member 12 (see the left side of FIG. 6) is securable to the surface 5 in a fixed position by fastening members 31 (e.g., bolts and nuts). In the secured position with the fastening members 31 tightened, the lower surface 24 of the attaching member 12 will abut or at least be adjacent and aligned substantially parallel to the surface 5. Similarly, the upper surface 24' of the upper attaching member 12' will be fastened to the base portion 13 of the antenna system 1 with the upper surface 24' abutting or at least adjacent and aligned substantially parallel to an under surface 5' of the base portion 13. In this regard as seen in FIGS. 7a-7c, the base portion 13 has an arrangement 33 with bolts 35 that extend downwardly in FIGS. 7a-7c through holes in the base portion 13. The bolts 35 then protrude downwardly beyond the surface 5' (FIG. 7c) of the underside of the base portion 13. Like the lower attaching member 12, the upper attaching member 12' can then be secured to the base portion 13 so that the upper surface 24' (FIG. 3) of the attaching member 12' is abutting or at least adjacent and aligned substantially parallel to the surface 5' of the base portion 13 (see FIG. 7c and also the perspective view of FIG. 8). The mobile satellite antenna system 1 and transport vehicle 7 in both embodiments of FIGS. 1 and 2 then have substantially parallel surfaces (e.g., 5,5') with the lower surface 24 of the lower attaching member 12 secured against the surface 5 of the transport vehicle 7 and the upper surface 24' of the upper attaching member 12' secured against the surface 5' of the antenna system 1 in substantially parallel alignment. The inclined surfaces 22,22' are then also parallel to each other with the axis 8 substantially perpendicular to the surfaces 22,22'.

Figure 9A:
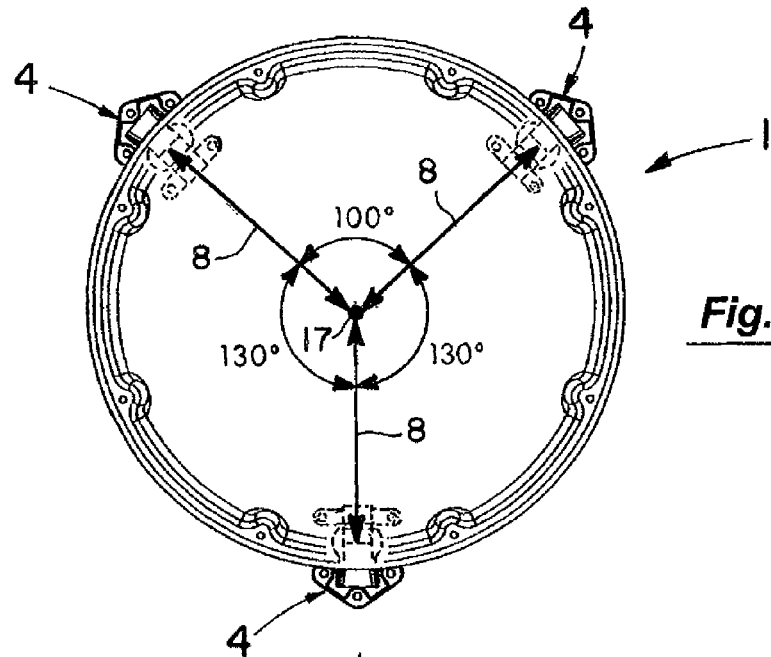
FIGS. 9a-9b are top and side view of the antenna system as secured to a substantially horizontal surface on the transport vehicle itself or on the side support arrangement attached to the transport vehicle.
Figure 9B:
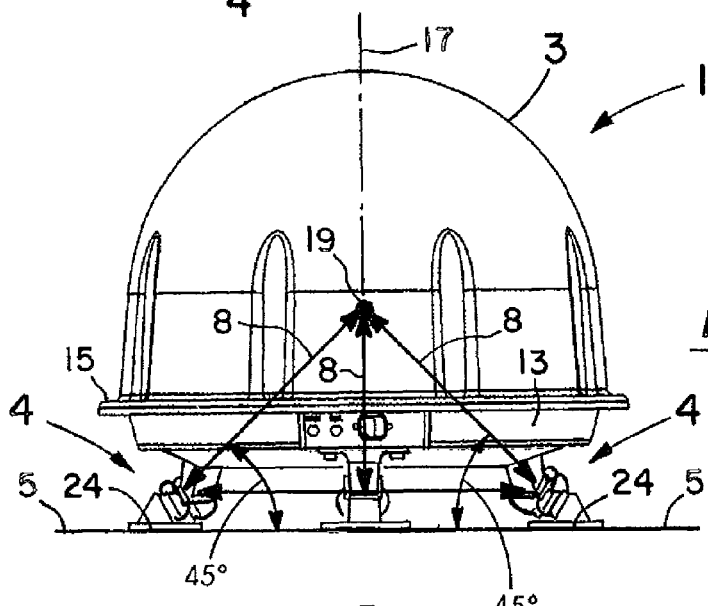

In this manner and as illustrated in FIGS. 9a-9b, the axis 8 of the spring element 6 of each isolator 4 can be aligned to substantially intersect the central axis 17 of the satellite antenna system 1. The axes 8 in this regard preferably intersect the central axis 17 at 45 degrees as in FIG. 9b. The axes 8 also preferably intersect the central axis 17 and each other at a common point 19 along the central axis 17 (FIG. 9b). This common point 19 is preferably within the dome 3 as shown and substantially at the center of gravity of the antenna system 1. To the extent the center of gravity is not intersected by the axes 8 of the isolators 4 being inclined at 45 degrees, the angle of one or both of the inclined surfaces 22,22' of one or more of the lower and upper attaching members 12,12' can be varied to do so if desired. One or more of the surfaces 24,24' of the lower and upper attaching members 12,12' could similarly be modified to do so. To the extent the surface 5 on the transport vehicle 7 is not uniform and, for example, the surfaces 24 of the lower attaching members 12 of the isolators 4 are not coplanar, the axes 8 of the isolators still preferably intersect or substantially intersect the central axis 17. This is the case whether or not the surface 5 on the transport vehicle 7 is an existing part such as the roof as in FIG. 1 or is created by an arrangement such as 11 in FIG. 2.

Figure 9C:
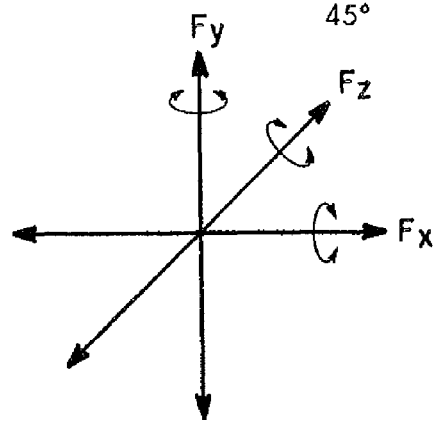
FIG. 9c schematically illustrates that the isolators of the present invention can minimize and absorb vibration and shock forces generated from virtually all directions along or about the orthogonal axes.

The three isolators 4 as shown in FIG. 9a are substantially evenly spaced from each other about the central axis 17 but the exact spacing can vary if desired from being substantially equal (i.e., 120 degrees apart) to as shown (e.g., plus/minus 30 degrees). Regardless and as schematically shown in FIG. 9c, the arrangement of the isolators 4 of the mount of the present invention serves to minimize and absorb vibration (e.g., 2-500 Hz) and shock forces (20 G's) generated from virtually all directions along or about the orthogonal axes by the transport vehicle.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims. In particular, it is noted that the word substantially is utilized herein to represent the inherent degree of uncertainty that may be attributed to any quantitative comparison, value, measurement or other representation. This term is also utilized herein to represent the degree by which a quantitative representation may vary from a stated reference without resulting in a change in the basic function of the subject matter involved.

I claim:

1. A vibration and shock isolation mount for a mobile satellite antenna system (1) securable on a transport vehicle (7), the mobile satellite antenna system (1) having a base portion (13) extending about a substantially central axis (17) and said isolation mount including:
at least three vibration and shock isolators (4) respectively attachable between the base portion (13) of the mobile satellite antenna system (1) and the transport vehicle (7), said isolators being spaced substantially evenly about the central axis of the mobile satellite antenna system wherein each isolator (4) has a central spring element (6) extending along a first axis (8) and secured between first and second block members (10,10') to permit said block members to move in multiple directions relative to each other including toward and away from each other along said first axis (8) of said central spring element (6), each isolator (4) further including first and second attaching members (12,12') for securing the respective first and second block members (10,10') to the base portion (13) of the mobile satellite antenna system (1) and the transport vehicle (7) with the first axes (8) of the spring elements (6) aligned to substantially intersect each other and the central axis (17) of the mobile satellite antenna system (1) wherein the respective block members (10, 10') are rigidly secured to the first surfaces (22,22') of the respective attaching members (12,12') of each isolator (4) in a respective rigid and fixed position relative to each other.

2. The isolation mount of claim 1 wherein each of the first axes (8) of each respective spring element (6) intersects the central axis (17) of the mobile satellite antenna system (1) at substantially 45 degrees.

3. The isolation mount of claim 2 wherein said first axes (8) intersect each other substantially at a common point (19) along the central axis (17) of the mobile satellite antenna system (1).

4. The isolation mount of claim 3 wherein said common point (19) is substantially at the center of gravity of the mobile satellite antenna system (1).

5. The isolation mount of claim 4 wherein said mobile satellite antenna system (1) has a protective, covering dome (3) and said common point (19) is within said dome (3).

6. The isolation mount of claim 5 wherein said isolators (4) are positioned outside of said dome (3).

7. The isolation mount of claim 1 wherein said first axes (8) of said spring elements (6) intersect each other substantially at a common point (19) along the central axis (17) of the mobile satellite antenna system (1).

8. The isolation mount of claim 7 wherein said mobile satellite antenna system (1) has a protective, covering dome (3) and said common point (19) is within said dome (3).

9. The isolation mount of claim 8 wherein said isolators (4) are positioned outside of said dome (3).

10. A vibration and shock isolation mount for a mobile satellite antenna system (1) securable on a transport vehicle (7), the mobile satellite antenna system (1) having a base portion (13) extending about a substantially central axis (17) and said isolation mount including:
three vibration and shock isolators (4) respectively attachable between the base portion (13) of the mobile satellite antenna system (1) and the transport vehicle (7), said three isolators being spaced substantially evenly about the central axis of the mobile satellite antenna system wherein each isolator (4) has a central spring element (6) extending along a first axis (8) and secured between first and second block members (10,10') to permit said block members to move in multiple directions relative to each other including toward and away from each other along said first axis (8) of said central spring element (6), each isolator (4) further including first and second attaching members (12,12') for securing the respective first and second block members (10,10') to the base portion (13) of the mobile satellite antenna system (1) and the transport vehicle (7) with the first axes (8) of the spring elements (6) aligned to substantially intersect each other and the central axis (17) of the mobile satellite antenna system (1) wherein each attaching member (12, 12') of each isolator (4) has respective first and second surfaces (22,24 and 22',24') at substantially 45 degrees to each other and said transport vehicle (7) and the base portion (13) of the mobile satellite antenna system (1) have respective surfaces (5,5') substantially parallel to each other wherein the attaching members (12,12') of each isolator (4) are respectively securable to the transport vehicle (7) and the base portion (13) of the mobile satellite antenna system (1) with the second surfaces (24, 24') of the respective attaching members (12,12') substantially parallel to the respective surfaces (5,5') of the transport vehicle (7) and base portion (13) of the mobile satellite antenna system (1) and to each other and with the first surfaces (22,22') of the respective attaching members (12,12') substantially parallel to each other.

11. The isolation mount of claim 10 wherein the first surfaces (22,22') of the respective attaching members (12,12') extend substantially 45 degrees to the respective parallel surfaces (5,5') of the transport vehicle (7) and the base portion (13) of the mobile satellite antenna system (1).

12. The isolation mount of claim 11 wherein the first axis (8) of each respective spring element (6) is substantially perpendicular to the respective first surfaces (22,22') of each isolator (4).

13. A vibration and shock isolation mount for a mobile satellite antenna system (1) securable on a transport vehicle (7), the mobile satellite antenna system (1) having a base portion (13) extending about a substantially central axis (17) and said isolation mount including:
at least three vibration and shock isolators (4) respectively attachable between the base portion (13) of the mobile satellite antenna system (1) and the transport vehicle (7), said isolators being spaced substantially evenly about the central axis of the mobile satellite antenna system wherein each isolator (4) has a central spring element (6) extending along a first axis (8) and secured between first and second block members (10,10') to permit said block members to move in multiple directions relative to each other including toward and away from each other along said first axis (8) of said central spring element (6), each isolator (4) further including first and second attaching members (12,12') for securing the respective first and second block members (10,10') to the base portion (13) of the mobile satellite antenna system (1) and the transport vehicle (7) with the first axes (8) of the spring elements (6) aligned to substantially intersect each other and the central axis (17) of the mobile satellite antenna system (1) wherein the block members (10,10') are respectively securable to the first surfaces (22,22') of the respective attaching members (12,12') of each isolator (4) in a respective fixed position relative thereto wherein each first surface (22,22') of the respective attaching members (12,12') of each isolator (4) has spaced apart, substantially parallel ridges (28,28') thereon to substantially abut substantially parallel, spaced apart side portions of the respective block members (10,10') secured thereto.

14. The isolation mount of claim 1 wherein each of the attaching members (12,12') of each isolator (4) is respectively securable to said transport vehicle (7) and mobile satellite antenna system (1) in a fixed position relative thereto.

15. The isolation mount of claim 1 wherein the spring element (6) of each isolator (4) is a wire rope.

* * * * *